United States Patent
Yamane et al.

(10) Patent No.: US 7,829,649 B2
(45) Date of Patent: Nov. 9, 2010

(54) PERFLUOROPOLYETHER-POLYORGANOSILOXANE BLOCK COPOLYMER AND A SURFACE TREATMENT AGENT COMPRISING THE SAME

(75) Inventors: Yuji Yamane, Annaka (JP); Noriyuki Koike, Takasaki (JP); Koichi Yamaguchi, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1 day.

(21) Appl. No.: 12/323,282

(22) Filed: Nov. 25, 2008

(65) Prior Publication Data

US 2009/0143543 A1 Jun. 4, 2009

(30) Foreign Application Priority Data

Nov. 30, 2007 (JP) .............................. 2007-311075

(51) Int. Cl.
C08G 77/04 (2006.01)
(52) U.S. Cl. .......................... 528/25; 525/474; 528/401
(58) Field of Classification Search .................... 528/25
See application file for complete search history.

(56) References Cited

U.S. PATENT DOCUMENTS

| 5,420,189 A * | 5/1995 | Kishita et al. ............... 524/731 |
| 7,196,212 B2 | 3/2007 | Yamaguchi et al. |
| 2007/0149746 A1 | 6/2007 | Yamane et al. |
| 2008/0071042 A1 * | 3/2008 | Yamane et al. ............... 525/474 |

FOREIGN PATENT DOCUMENTS

| JP | 11-029585 A | 2/1999 |
| JP | 2000-143991 A | 5/2000 |
| JP | 2003-238577 A | 8/2003 |
| JP | 2007-197425 A | 8/2007 |

* cited by examiner

*Primary Examiner*—Randy Gulakowski
*Assistant Examiner*—Lindsay Nelson
(74) *Attorney, Agent, or Firm*—Birch Stewart Kolasch & Birch, LLP

(57) ABSTRACT

A perfluoropolyether-polyorganosiloxane block copolymer represented by the following formula (1), the block copolymer having a number average molecular weight, reduced to polystyrene, of from 2,000 to 20,000, $$W2\text{-}Q\text{-}Rf\text{-}Q\text{-}(W1\text{-}Q\text{-}Rf\text{-}Q)_g\text{-}W2 \quad (1)$$

wherein Rf is a perfluoropolyether block, W1 is a polyorganosiloxane block having at least one group represented by the following formula (2)

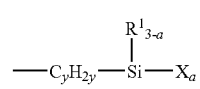

wherein X is a hydrolyzable group, $R^1$ is a $C_{1-4}$ alkyl group or a phenyl group, y is an integer of from 1 to 5, and a is 2 or 3, Q is a $C_{2-12}$ divalent connecting group which may contain an oxygen atom and/or nitrogen atom, W2 is an organosiloxane residue having a group represented by the aforesaid formula (1), and g is an integer of from 1 to 11.

9 Claims, 2 Drawing Sheets

PERFLUOROPOLYETHER-POLYORGANOSILOXANE BLOCK COPOLYMER AND A SURFACE TREATMENT AGENT COMPRISING THE SAME

CROSS REFERENCE

This application claims benefit of Japanese Patent application No. 2007-311075 filed on Nov. 30, 2007, the contents of which are hereby incorporated by reference.

FIELD OF THE INVENTION

The present invention relates to a polymer having a perfluoropolyether block and a surface treatment composition comprising the same which is used for forming a water- and oil-repellent coating. The polymer has polyorganosiloxane moieties having a hydrolyzable group at both ends of the polymer chain, and at least one polyorganosiloxane moiety located at a site other than the ends. The polymer is easy to apply, adheres well to a substrate, and can be cured rapidly.

BACKGROUND OF THE INVENTION

Compounds containing perfluoropolyether moieties generally have very small surface free energy to have water and oil repellency, chemical resistance, lubricity, releasing property, and antifouling property. Making use of these properties, they are widely used as, for example, treatment agents to make paper or fiber water- and oil-repellent, and foul-resistant, lubricants for magnetic storage media, oil repellent agents for precision apparatuses, releasing agents, cosmetics, and protective films.

These properties, on the other hand, mean that such a fluorine-containing compound does not bond to other materials. Even if it can be applied to a substrate, it hardly forms a coating bonded strongly to the substrate.

Meanwhile, it is well known that an organic compound can be bonded to a surface of glass or cloth via a silane coupling agent. The silane coupling agent has an organic functional group and a reactive silyl group, usually an alkoxy silyl group. The alkoxy silyl groups are autocondensed in the presence of moisture to form a siloxane coating film. At the same time, the alkoxy silyl group chemically bonds to glass or metal surface to form a durable film. The silane coupling agents are thus widely used as coating agents for various substrates.

Japanese Patent application Laid-Open No. 11-29585 and No. 2000-143991 describe an antireflective coating comprising an antifouling layer composed of the following perfluoropolyether-modified aminosilane having an alkoxy silyl group

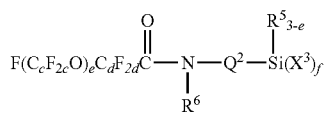

wherein $X^3$ is a hydrolyzable group, $R^5$ is a lower alkyl group, $R^6$ is a hydrogen atom or a lower alkyl group, $Q^2$ is a group of the formula, $CH_2CH_2CH_2$ or $CH_2CH_2NHCH_2CH_2CH_2$, e is an integer of from 6 to 50, f is 2 or 3, each of c and d is an integer of from 1 to 3.

Drawbacks of the antireflective coating are a long time required for curing and insufficient adhesion strength to a substrate.

Japanese Patent application Laid-Open No. 2003-238577 discloses a silane coupling agent having a perfluoropolyether moiety having two or three hydrolyzable groups at both ends

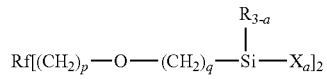

wherein Rf is a divalent linear perfluoropolyether moiety, R is an alkyl group having 1 to 4 carbon atoms or a phenyl group, X is a hydrolyzable group, p is an integer of 0 to 2, q is an integer of 1 to 5, and a is 2 or 3.

It is described that the silane coupling agent forms a cured coating which strongly adheres to a substrate and is antifouling, easy to clean, and abrasion resistant because of surface slickness. However, the coating therefrom has poor transparency.

Japanese Patent application Laid-Open No. 2007-197425 describes a perfluoropolyether organopolysiloxane which has relatively large organopolysiloxane moiety at an end or both ends and gives an abrasion resistant cured coating.

SUMMARY OF THE INVENTION

The aforesaid surface treatment agents have polar moiety such as silane moiety and tend to agglomerate, causing fisheyes or opacity or cloudiness in coating. They would adversely affect optical properties of antireflective coatings or transparent substrates. When these agents are used as release agents for a finely patterned metal mold or imprinting mold, they may not be able to reproduce the fine pattern.

To improve the aforesaid surface treatment agents in solubility in a solvent and surface slickness of coatings thereof, the present inventors have developed a copolymer having an organosiloxane block in a polymer main chain (Japanese Patent Application No. 2007-215233). A coating obtained from the copolymer is excellent in surface slickness and transparency. However, there is still room of improvement in curability and adhesion strength. An object of the present invention is thus to make improvements in these properties.

After extensive studies, it was found that a polar group located only at ends is a cause of increased agglomeration and decreased curability.

The present invention is a perfluoropolyether-polyorganosiloxane block copolymer represented by the following formula (1), the block copolymer having a number average molecular weight, reduced to polystyrene, of from 2,000 to 20,000, $$W2\text{-}Q\text{-}Rf\text{-}Q\text{-}(W1\text{-}Q\text{-}Rf\text{-}Q)_g\text{-}W2 \quad (1)$$

wherein Rf is a perfluoropolyether block, W1 is a polyorganosiloxane block having at least one group represented by the following formula (2)

wherein X is a hydrolyzable group, $R^1$ is a $C_{1-4}$ alkyl group or a phenyl group, y is an integer of from 1 to 5, and a is 2 or 3, Q is a $C_{2-12}$ divalent connecting group which may contain an oxygen atom and/or nitrogen atom, W2 is an organosiloxane residue having a group represented by the aforesaid formula 2, and g is an integer of from 1 to 11.

The copolymer of the present invention has a hydrolyzable group not only at ends but also at a site other than ends. It hardly agglomerates and forms a highly transparent cured coating. It can be cured at room temperature or at an elevated temperature faster than the conventional copolymer to form a coating having higher adhesion strength, water- and oil repellency, surface slickness, releasing property and abrasion resistance.

PREFERRED EMBODIMENTS OF THE INVENTION

Figure 1:
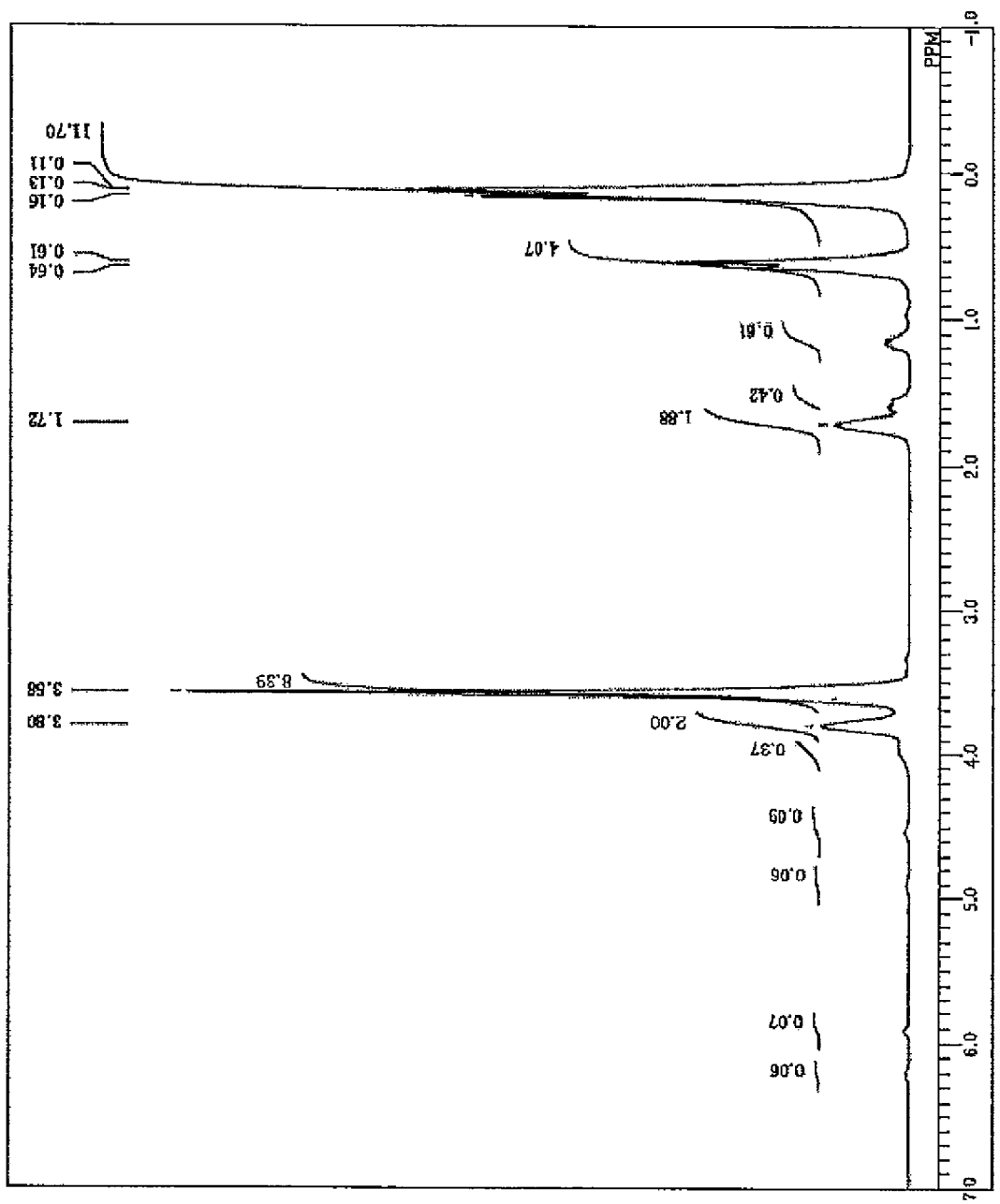
FIG. 1 is a $^1$H-NMR chart of Copolymer 1 prepared in Example 1.

The copolymer of the present invention is an alternate copolymer of an perfluoropolyether block (Rf) and a polyorganosiloxane block (W1) as represented by the following formula (1).

$$W2\text{-}Q\text{-}Rf\text{-}Q\text{-}(W1\text{-}Q\text{-}Rf\text{-}Q)_g\text{-}W2 \qquad (1)$$

Since the polyorganosiloxane block (W1) as well as the polyorganosiloxane residue (W2) has a hydrolyzable group, the copolymer adheres strongly to a substrate.

In the formula (1), g is an integer of from 1 to 11, preferably 1 to 3. Preferred copolymers are the one represented by the following formula (1-1) with g being 1, and $$W2\text{-}Q\text{-}Rf\text{-}Q\text{-}W1\text{-}Q\text{-}Rf\text{-}Q\text{-}W2 \qquad (1\text{-}1)$$

the one represented by the following formula (1-2) with g being 2

$$W2\text{-}Q\text{-}Rf\text{-}Q\text{-}W1\text{-}Q\text{-}Rf\text{-}Q\text{-}W1\text{-}Q\text{-}Rf\text{-}Q\text{-}W2 \qquad (1\text{-}2).$$

The copolymer has a number average molecular weight determined by GPC using polystyrene standards of from 2,000 to 20,000, preferably from 3,000 to 15,000, more preferably from 4,000 to 10,000. A copolymer having a molecular weight smaller than the aforesaid lower limit may fail to form a cured coating having satisfactory water- and oil-repellency and releasing property, and the one having a molecular weight larger than the aforesaid upper limit may fail to form a cured coating having satisfactory adhesion strength.

Preferably, a silicon content of a molecule of the copolymer ranges from 1 to 30 wt % of a molecular weight. A copolymer with a silicon content smaller than the aforesaid lower limit may not have good solubility and may be difficult to handle in surface treating process. On the other hand, a copolymer with silicon content larger than the aforesaid upper limit tends to form a cured coating having insufficient water- and oil-repellency. Silicon content can be determined by NMR spectroscopy, X-ray fluorescence spectroscopy or X-ray photoelectron spectroscopy.

Each of the polyorganosiloxane block (W1) and terminal organosiloxane residue (W2) has a group represented by the following formula (2)

In the formula (2), X is a hydrolyzable group which may be different from each other. Examples of the hydrolyzable group include alkoxy groups having 1 to 10 carbon atoms such as methoxy, ethoxy, propoxy and butoxy groups; oxyalkoxy groups having 2 to 10 carbon atoms such as methoxymethoxy and methoxyethoxy groups; acyloxy groups having 1 to 10 carbon atoms such as an acetoxy group; alkenyloxy groups having 2 to 10 carbon atoms such as an isopropenoxy group; halogen atoms such as chlorine, bromine, and iodine atoms. Among these, alkoxy groups having 1 to 10 carbon atoms, particularly methoxy, ethoxy, isopropenoxy groups and chlorine atom are preferred. $R^1$ is an alkyl group having 1 to 4 carbon atoms or a phenyl group, among which a methyl group is preferred. In the formula (2), a is 2 or 3, preferably 3, because of higher reactivity and stronger adhesion to a substrate, and y is an integer of from 1 to 5, preferably from 2 to 4.

There are at least three, preferably at least four, and at most 24, preferably at most 12, hydrolyzable groups per molecule of the copolymer. The polyorganosiloxane block (W1) and polyorganosiloxane residues (W2) may have different hydrolyzable group of the formula (2) from each other.

Examples of the polyorganosiloxane block (W1) having at least one group of the formula (2) include those represented by the following general formulas (A) and (B).

In the above formulas, $R^2$ may the same with or different from each other and is a hydrogen atom or a monovalent hydrocarbon group, among which alkyl groups, particularly methyl group is preferred; $R^1$, y, and a are as defined above for the formula (2); n is an integer of from 4 to 42, preferably from 4 to 12; m is an integer of from 3 to 5, and k is an integer of from 1 to 5.

Examples of the groups represented by the formula (A) and those represented by the formula (B) include the block of the following formula (7) with $R^1$ being a methoxy group, $R^2$ being a methyl group, n=1, and k=1,

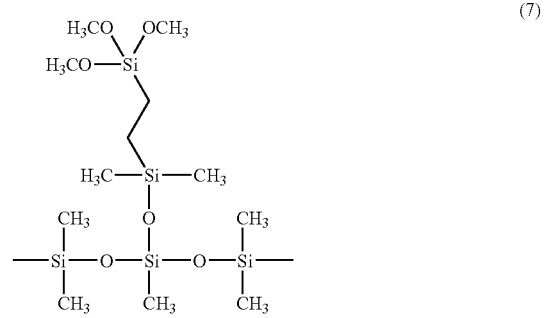

the one of the following formula (8) with k=2, and

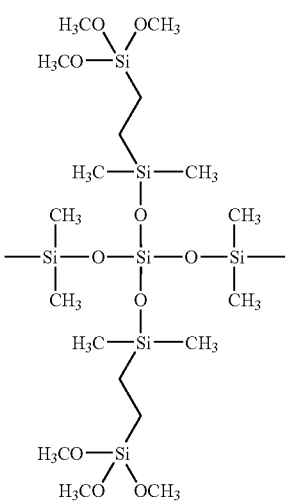
(8)

the one of the following formula (9) with m=4 and k=2 in the formula (B).

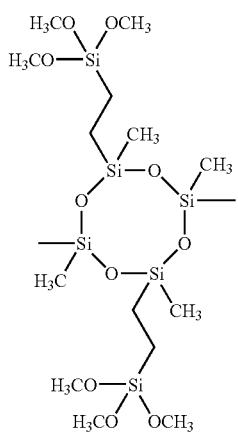
(9)

The organosiloxane residue (W2) has one group of the formula (2) and is located at molecular ends. An example of W2 is a group represented by the following general formula (C)

$$Si_zR^3{}_{2z}(C_yH_{2y}SiR^1{}_{3-a}X_a)O_{z-1} \quad (C)$$

wherein $R^3$ is a hydrogen atom or a monovalent hydrocarbon group, preferably a methyl group, z is an integer of from 1 to 12, preferably from 2 to 5, and $R^1$, y, and a are as defined above for the formula (2).

W2 has the group of the formula (2) preferably at an end, and is preferably represented by the following formula (10).

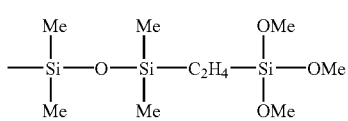
(10)

The perfluoropolyether block (Rf) comprises a plurality of a repeating unit represent by the following general formula.

—$C_jF_{2j}O$— wherein j is an integer of 1 or larger, preferably from 1 to 6, more preferably from 1 to 4.

The repeating unit, —$C_jF_{2j}O$—, may be linear or branched and examples thereof are as shown below.

—$CF_2O$—

—$CF_2CF_2O$—

—$CF_2CF_2CF_2O$—

—$CF(CF_3)CF_2O$—

—$CF_2CF_2CF_2CF_2O$—

—$CF_2CF_2CF_2CF_2CF_2CF_2O$—

—$C(CF_3)_2O$—

The perfluoropolyether block may comprise two or more of these repeating units. Preferably, Rf is selected from the groups represented by the following formulas (3), (4) and (5),

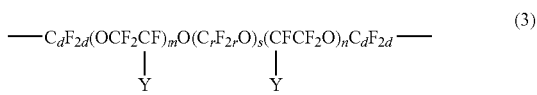
(3)

wherein Y is F or $CF_3$, which may be different with each other, and r is an integer of from 2 to 6, d is an integer of from 1 to 3, each of m and n is an integer of from 0 to 200 with m+n ranging from 2 to 200, s is an integer of from 0 to 6, and the repeating units such as ($C_rF_{2r}O$) may be bonded randomly;

—$C_dF_{2d}(CF_2CF_2CF_2O)_lC_dF_{2d}$— (4)

wherein l is an integer of from 1 to 200, and d is an integer of from 1 to 3;

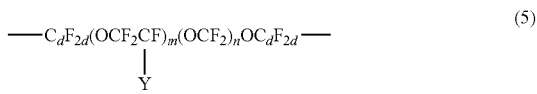
(5)

wherein Y is F or $CF_3$, d is an integer of from 1 to 3, each of m and n is an integer of from 0 to 200 with m+n ranging from 2 to 200, and the repeating units may be bonded randomly.

More preferably, a total number of the aforesaid repeating units ranges from 1 to 60, most preferably from 10 to 50. Particularly, the repeating unit represented by the following formula (6), which corresponds to the formula (5) with d=1 and Y being F, is preferred because of small coefficient of dynamic friction and slickness in wiping of a coating therefrom.

—$CF_2(OC_2F_4)_m(OCF_2)_nOCF_2$— (6)

wherein m is an integer of from 0 to 50, n is an integer of from 1 to 50, with m+n ranging from 2 to 60.

In the formula (1), Q is a $C_{2-12}$ divalent group, which connects an organosiloxane block and the perfluoroether block and may contain an oxygen atom and/or nitrogen atom such as in an amide, ether, or ester group. Examples of Q are as shown below.

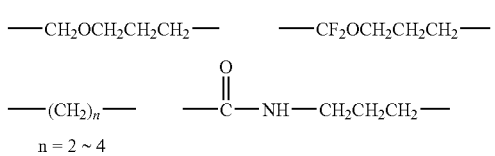

n = 2 ~ 4

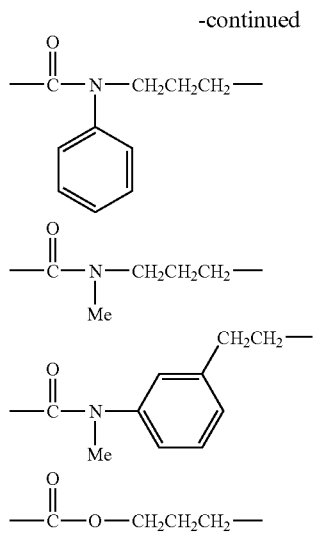
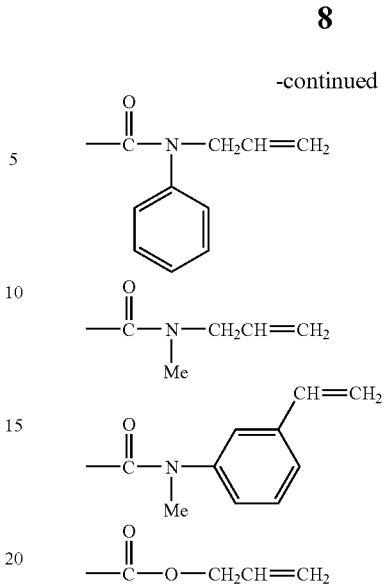

Among these, the following group, —CH$_2$OCH$_2$CH$_2$CH$_2$—, is preferred because of ease to prepare.

The present copolymer can be prepared by the following method.

In the first step, a compound represented by the following formula having an unsaturated group,

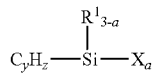

wherein R$^1$, X, a and y are as defined above and z equals 2y−1, and an organohydrogenpolysiloxane having at least three SiH bonds to derive W1 are subjected to an addition reaction in the presence of an addition reaction catalyst such as a platinum catalyst to prepare an organohydrogenpolysiloxane W1' having a hydrolyzable group.

In a similar manner, the aforesaid compound and an organohydrogenpolysiloxane having at least two SiH bonds to derive W2 are subjected to an addition reaction to prepare an organohydrogenpolysiloxane W2' having a hydrolyzable group.

In the second step, the organohydrogenpolysiloxane W1' which has remaining SiH bonds, and a compound represented by the formula, Q'RfQ' are subjected to an addition reaction in the presence of a platinum catalyst, 2(Q'RfQ')+HW1'H→Q'RfQW1QRfQ' wherein Rf is as defined above, and Q' is a group having an unsaturated group as shown below.

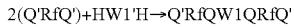
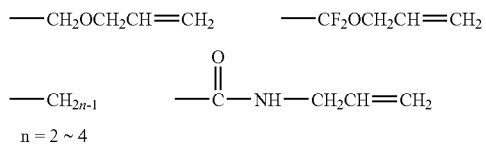

n = 2 ~ 4

Then, the SiH group of W2' is added to the unsaturated group at the end of RfQ' to prepare a copolymer represented by the following formula (1-1).

W2-Q-Rf-Q-W1-Q-Rf-Q-W2    (1-1).

In addition to the copolymer, the surface treatment composition may comprise a catalyst for hydrolysis and condensation reactions. Examples of the catalyst include organic tin compounds such as bibutyltin dimethoxide and dibutyltin dilaurate; organic titanium compounds such as tetra-n-butyl titanate; organic acids such as acetic acid and methanesulfonic acid; inorganic acids such as hydrochloric acid and sulfuric acid, among which acetic acid, tetra-n-butyl titanate, and dibutyltin dilaurate are preferred. A content of the catalyst may be a catalytic amount, which typically ranges from 0.01 to 5 parts by weight, particularly from 0.1 to 1 part by weight per 100 parts by weight of the organopolysiloxane and/or partial condensate of hydrolyzate thereof.

The surface treatment composition may also comprise a solvent. Examples of the solvent include fluorine-modified aliphatic hydrocarbon solvents such as perfluoroheptane and perfluoroctane; fluorine-modified aromatic hydrocarbon solvents such as m-xylenehexafluoride and bezotrifluoride; fluorine-modified ether solvents such as methyl perfluorobutyl ether, ethyl perfluorobutyl ether, and perfluoro(2-butyltetrahydroturan); fluorine-modified alkylamine solvents such as perfluorotributylamine, and perfluorotripentylamine; hydrocarbon solvents such as petroleum benzene, mineral spirits, toluene, and xylene; ketone solvents such as acetone, methylethylketone, and methylisobutylketone. Among these, fluorinated solvents are preferred such as m-xylenehexafluoride, perfluoro(2-butyltetrahydrofuran), perfluorotributylamine and ethyl perfluorobutyl ether because of higher dissolving capability and substrate wettability.

A mixture of two or more of the aforesaid solvents may be used. Preferably, the present fluorine-containing organopolysiloxane and/or partial condensation products of hydrolyzates thereof is dissolved homogeneously. The organopolysiloxane and/or partial condensate of hydrolyzates thereof is diluted with the solvent to a concentration of from 0.01 to 50 wt %, particularly from 0.05 to 20 wt %.

The surface treatment composition may be applied to a substrate by any known methods such as brushing, dipping, spraying and vapor deposition. Applied composition is processed at a temperature selected depending on the application method. When applied by brushing or dipping, the composition is processed at a temperature preferably of from room temperature to 120° C., more preferably in a humidified environment to promote curing reaction. A cured coating layer of the composition typically has a thickness of from 0.1 nm to 5 µm, particularly from 1 to 100 nm.

The present surface treatment composition may be applied to paper, cloth, metal and metal oxide, glass, plastic, or ceramics to provide water and oil repellency, releasing property, and foul resistance.

The present surface treatment composition can be used for various applications, for example, fingerprint- or sebum-proof coating of optical parts such as spectacle lenses, and antireflection filter; water repellent or antifouling coating of sanitary products such as bathtubs and wash-basins; antifouling coating of window glasses of automobiles, trains, airplanes, and headlamp covers; water repellent or antifouling coating of exterior wall materials; oil-repellent coating of kitchen architectural material; fingerprint-proof coating of compact disks or DVD. It may be used also as a coating additive, a resin improver, a dispersion or flow improver for inorganic filler, and a lubricity improver for tape or film.

EXAMPLES

The present invention is explained with reference to the following examples, but is not limited thereto.

Example 1

In a reactor, 200 g of perfluoropolyether compound represented by the following formula (1) having α-unsaturated bonds at both ends, $$CH_2=CH-CH_2-O-CH_2-Rf-CH_2-O-CH_2-CH=CH_2 \quad (I)$$

Rf: $-CF_2(OC_2F_4)_p(OCF_2)_qOCF_2-$ wherein p/q is 0.9 and p+q is about 45 on average, hereinafter represents p+q=45, 10.2 g of a siloxane compound represented by the following formula (II) having SiH bonds at both ends, and

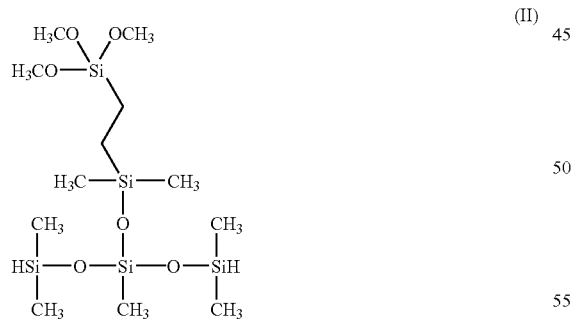

(II)

400 g of m-xylene fluoride were placed and mixed by stirring at a temperature of 90° C. To the mixture obtained, 0.0442 g, i.e., $1.1\times10^{-7}$ mole as Pt, of a solution of a complex of chloroplatinic acid with a vinylsiloxane in toluene was added dropwise and then heated at a temperature of 90° C. for 4 hours. Subsequently, 16.7 g of a 1:1 adduct of tetramethyldisiloxane (HM) and vinyltrimethoxysilane (VMS), hereinafter referred to as HM-VMS adduct, was added dropwise and then heated at a temperature of 90° C. for 2 hours. By removing the solvent and unreacted HM-VMS adduct by vacuum distillation, 210.7 g of slightly cloudy liquid product, herein after referred to as "copolymer 1", was obtained.

The HM-VMS adduct was prepared by the following method. In a reactor, 400 g of tetramethyldisiloxane (HM) of the following formula (III),

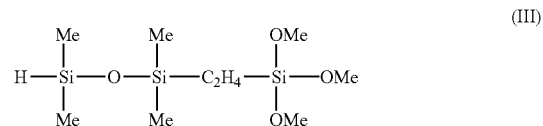

(III)

and 400 g of toluene were mixed and heated at 80° C., to which 442 g of vinyltrimethoxysilane (VMS) and 20 g, i.e., $1.1\times10^{-6}$ mole as Pt, of a solution of a complex of chloroplatinic acid with a vinylsiloxane in toluene were added dropwise slowly. By purifying the reaction mixture by distillation, 84 g of HM-VMS adduct was obtained.

Copolymer 1 showed $^1$H-NMR spectrum as shown in FIG. 1 with the following chemical shifts from TMS.

| $^1$H-NMR spectra (δ, ppm) | |
|---|---|
| —SiCH$_3$    —CH— | 0 ~ 0.2 ppm |
| ≡SiCH$_2$CH$_2$Si≡ | 0.5 ~ 0.8 ppm |
| CH$_3$ | 1.0 ~ 1.2 ppm |
| —CH$_2$CH$_2$Si≡ | 1.6 ~ 1.8 ppm |
| —SiOCH$_3$ | 3.5 ~ 3.7 ppm |
|  | 3.5 ~ 3.7 ppm |
| —CH$_2$OCH$_2$— | 3.7 ~ 3.9 ppm |

From the above data, Copolymer 1 was found to have the following structure:

$$W_2-Q-Rf-Q-W_1-Q-Rf-Q-W_2$$

W1:

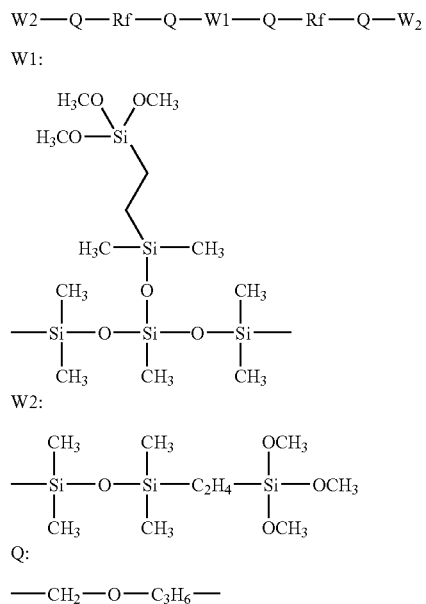

W2:

Q:

$$-CH_2-O-C_3H_6-$$

-continued

Rf:

—CF$_2$(OC$_2$F$_2$)$p$(OCF$_2$)$q$OCF$_2$— p/q = 0.9   p + q = 45 wherein Rf is bonded to CH$_2$ group of Q. Copolymer 1 had a number average molecular weight, determined by GPC using polystyrene standards, of 9,000.

Example 2

The procedures used in Example 1 were repeated except that a perfluoroether with p/q being 0.9, and p+q being 23 on average was used in place of the perfluoropolyether of the formula (1). A liquid product, hereinafter referred to as "Copolymer 2" was obtained.

Figure 2:
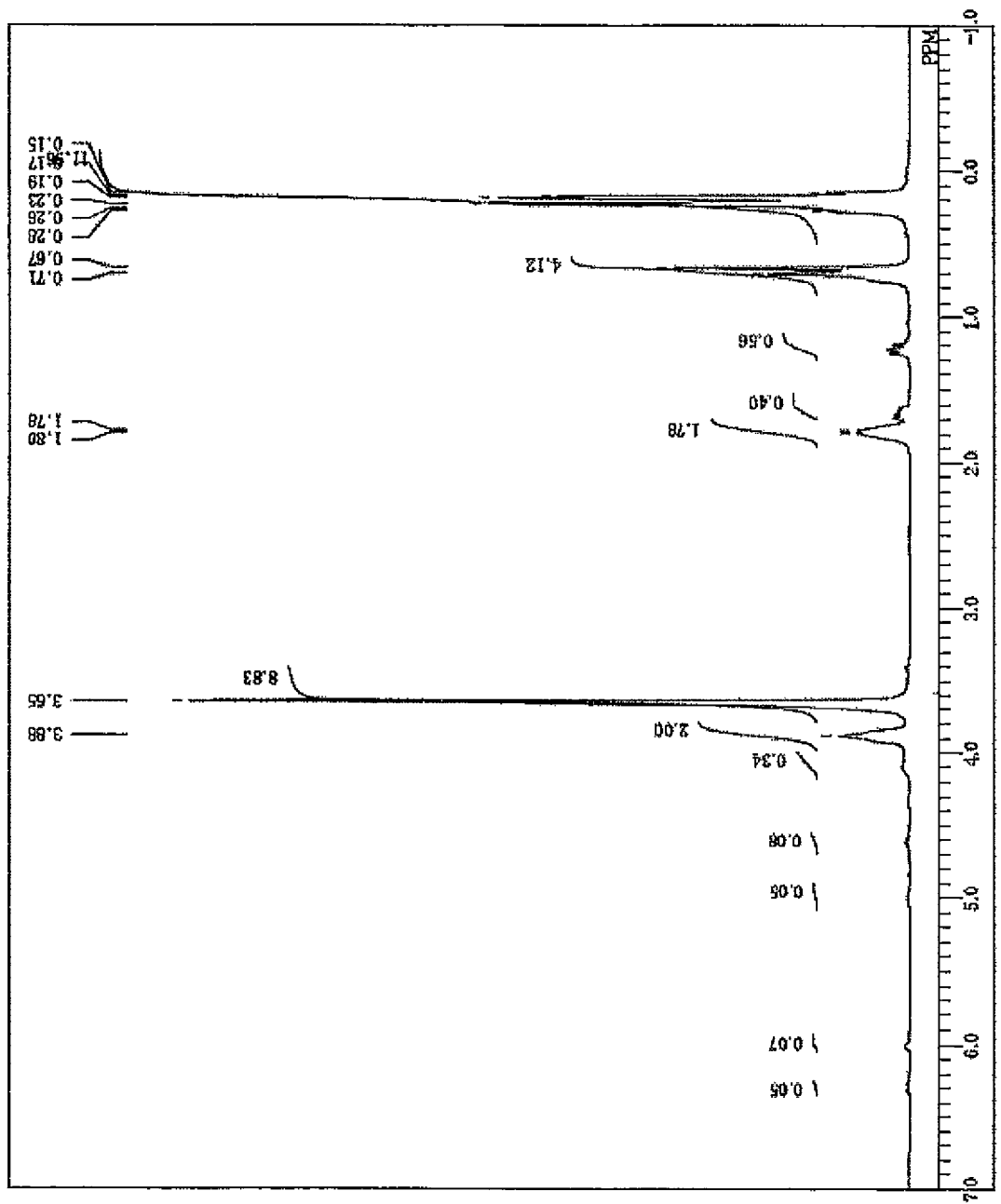
FIG. 2 is a $^1$H-NMR chart of Copolymer 2 prepared in Example 2.

Copolymer 2 showed $^1$H-NMR spectrum as shown in FIG. 2 with the following chemical shifts from TMS.

$^1$H-NMR spectra (δ, ppm)

| | |
|---|---|
| —SiCH$_3$   —CH— | 0 ~ 0.3 ppm |
| ≡SiCH$_2$CH$_2$Si≡ | 0.5 ~ 0.8 ppm |
| \|<br>CH$_3$ | 1.1 ~ 1.2 ppm |
| —CH$_2$CH$_2$Si≡ | 1.6 ~ 1.9 ppm |
| —SiOCH$_3$ | 3.5 ~ 3.8 ppm |
| —CH$_2$OCH$_2$— | 3.6 ~ 3.8 ppm |
| | 3.7 ~ 3.9 ppm |

From the above data, Copolymer 2 was found to have the following structure:

W2—Q—Rf—Q—W1—Q—Rf—Q—W2

W1:

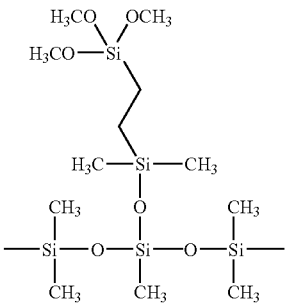

W2:

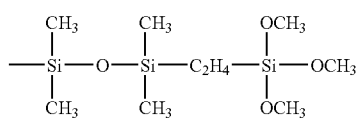

Q:

—CH$_2$—O—C$_3$H$_6$—

Rf:

—CF$_2$(OC$_2$F$_2$)$p$(OCF$_2$)$q$OCF$_2$— p/q = 0.9   p + q = 23 wherein Rf is bonded to CH$_2$ group of Q. Copolymer 2 had a number average molecular weight, determined by GPC using polystyrene standards, of 5,000.

Comparative Examples 1-4, Referential Example 1

The following compounds were used as comparative or referential compounds and evaluated in the same manner as used for evaluating Copolymers 1 and 2.

Comparative Compound 1

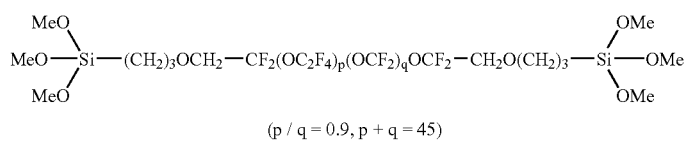

(p / q = 0.9, p + q = 45)

Comparative Compound 2

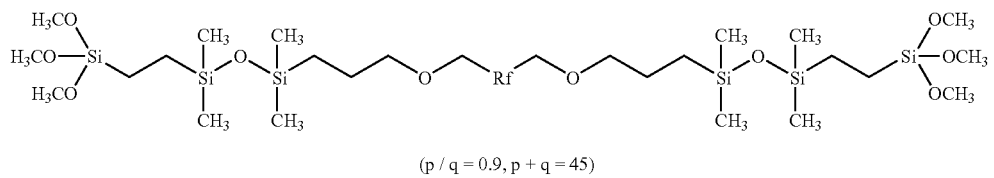

(p / q = 0.9, p + q = 45)

Comparative Compound 3

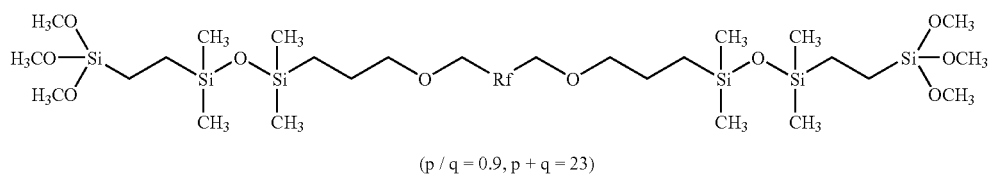

(p / q = 0.9, p + q = 23)

-continued

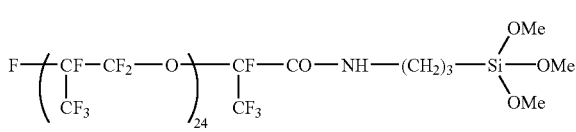

Comparative Compound 4

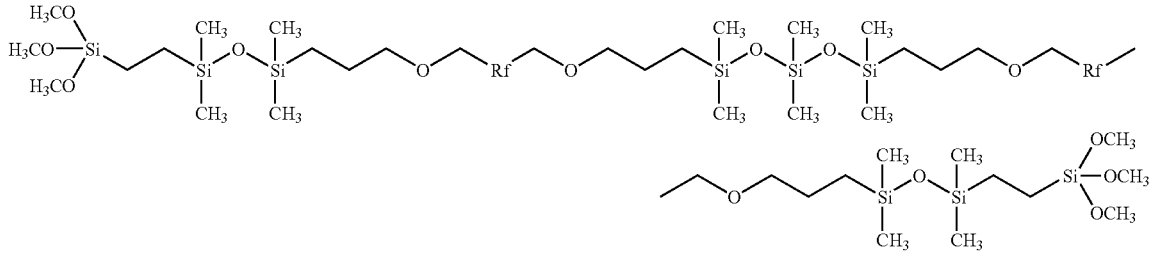

Referential Compound 1

(p / q = 0.9, p + q = 45)

Preparation of Surface Treatment Compositions

Surface treatment compositions 1 and 2 were prepared by dissolving each of the Copolymer 1 and 2 in a concentration of 0.3 wt % in ethyl perfluorobutyl ether (HFE-7200, ex Sumitomo 3M Co.).

Preparation of Cured Coatings

A cured coating was prepared by dipping a slide glass in each of the surface treatment compositions for 10 seconds and then pulling up the slide glass at a pulling rate of 150 mm/min followed by leaving the slide glass in an environment of a relative humidity of 40% for 10 minutes for evaluating curability and for 24 hours for other evaluation.

Methods of evaluation are as follows.

Water- and Oil-Repellency

Using a contact angle meter, Model A3, ex Kyowa InterFACE Science Co., Ltd., a water contact angle and an oleic acid receding contact angle of a cured coating were measured by sliding method. A water contact angle was measured also after rubbing in the abrasion resistance test.

Releasing Property

On a surface of a cured coating, a 19 mm-wide polyester tape, Nitto No. 31B, ex Nitto Denko Co., was bonded on which a load of 20 g/cm$^2$ was placed and aged for 24 hours at 25° C. Then, a force (N) required to peel the tape at an angle of 180-degree was measured with a tensile tester at a pulling rate of 300 mm/min.

Abrasion Resistance

Using a rubbing tester, ex Shinto Scientific Co., Ltd., a cured coating was rubbed under the following conditions and a water contact angle was measured:

Test environment: 25° C., relative humidity of 40%

Scrubbing material: The coating layers were scrubbed with a tip of the tester which was covered by eight sheets of nonwoven cloth (1.5 cm×1.5 cm) laid top on another and fixed by a rubber band.

Load: 2 kg

Number of scrubbing: 10,000 times

Curability

A water contact angle of a cured coating obtained by leaving the slide glass coated with a surface treatment composition in an environment of a relative humidity of 40% for 10 minutes.

Transparency

A cured coating was visually observed. In Table 1, "A" indicates that the coating was colorless and transparent; "B" indicates that cloudiness was detected depending on an incident angle of light; and "C" indicates that the coating was apparently cloudy.

The results are as shown in Table 1 in which "Comp." stands for "Comparative" and "Ref." stands for "Referential."

TABLE 1

| | Water- and Oil-Repellency | | | | | |
|---|---|---|---|---|---|---|
| | Water contact angle, deg | Oleic acid receding contact angle, deg | Releasing property, N | Abrasion resistance, deg | Curability, deg | Transparency |
| Example 1 | 106 | 65 | 0.07 | 106 | 100 | A |
| Example 2 | 103 | 63 | 0.1 | 103 | 93 | A |
| Comp. Example 1 | 108 | 68 | 0.09 | 92 | 85 | B |
| Comp. Example 2 | 107 | 66 | 0.13 | 105 | 87 | B |
| Comp. Example 3 | 105 | 65 | 0.15 | 98 | 80 | C |
| Comp. Example 4 | 114 | 73 | 0.14 | 74 | 85 | A |
| Ref. Example 1 | 107 | 67 | 0.04 | 104 | 65 | A |

As shown in Table 1, all the coatings prepared by curing surface treatment compositions for 24 hours showed a water-contact angle of at least 100 degrees, and an oleic acid receding contact angle of at least 60 degrees. However, in the coatings prepared by curing only 10 minutes, only those of Examples 1 and 2 showed water- and oil-repellency nearly the same level as those observed after 24-hour curing. The surface treatment compositions of Comparative Examples and Referential Example were slower in curing than those of Examples. The coatings of Examples 1 and 2 was resistant to rubbing, sustaining water contact angle, but those of Comparative Examples 1, 3 and 4 showed prominent decrease, indicating poorer abrasion resistance than Examples. Further, the coating of Examples 1 and 2 were transparent, whereas the compounds of Comparative Examples 1-3 agglomerated in the surface treatment compositions, resulting in opacity in the coatings.

The perfluoropolyether-polyorganosiloxane copolymer of the present invention is very useful as a surface treatment agent to form a coating which adheres strongly to a substrate and is excellent in transparency, water- and oil-repellency, releasing property, and abrasion resistance.

The invention claimed is:

1. A perfluoropolyether-polyorganosiloxane block copolymer represented by the following formula (1), the block copolymer having a number average molecular weight, reduced to polystyrene, of from 2,000 to 20,000, W2-Q-Rf-Q-(W1-Q-Rf-Q)$_g$-W2  (1)

wherein Rf is a perfluoropolyether block, W1 is a polyorganosiloxane block represented by the following general formula (A) or (B)

  (A)

  (B)

wherein $R^1$ is a $C_{1-4}$ alkyl group or a phenyl group, $R^2$ may be the same or different from each other and is a hydrogen atom or a monovalent hydrocarbon group, X is a hydrolyzable group, y is an integer of from 1 to 5, a is 2 or 3, n is an integer of from 4 to 42, m is an integer of from 3 to 50, and k is an integer of from 1 to 5

Q is a $C_{2-12}$ divalent connecting group which may contain an oxygen atom and/or nitrogen atom, W2 is an organosiloxane residue having a group represented by the following formula (2)

  (2)

wherein X, $R^1$, y, and a are as defined above for the general formulas (A) and (B), and g is an integer of from 1 to 11.

2. The perfluoropolyether-polyorganosiloxane block copolymer according to claim 1, wherein X is an alkoxy group having 1 to 10 carbon atoms.

3. The perfluoropolyether-polyorganosiloxane block copolymer according to claim 1, wherein X is a methoxy group and the polyorganosiloxane block (W1) is represented by the following formula (7).

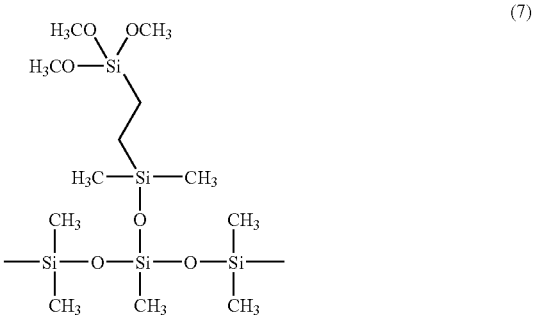  (7)

4. The perfluoropolyether-polyorganosiloxane block copolymer according to claim 1, wherein g is 1 or 2.

5. The perfluoropolyether-polyorganosiloxane block copolymer according to claim 1, wherein the perfluoropolyether block (Rf) is selected from the groups represented by the following general formula (3), (4), or (5),

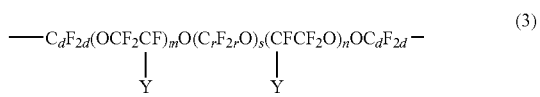  (3)

wherein Y may be the same or different from each other and is a fluorine atom or a $CF_3$ group, r is an integer of from 2 to 6, d is an integer of from 1 to 3, each of m and n is an integer of from 0 to 200 with m+n ranging from 2 to 200, s is an integer of from 0 to 6, and the repeating units may be distributed randomly;

  (4)

wherein l is an integer of from 1 to 200 and d is an integer of from 1 to 3; and

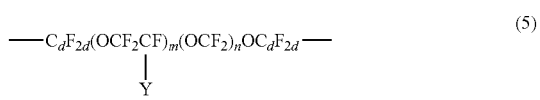  (5)

wherein Y is a fluorine atom or a $CF_3$ group, d is an integer of from 1 to 3, each of m and n is an integer of from 0 to 200 with m+n ranging from 2 to 200, and the repeating units may be distributed randomly.

6. The perfluoropolyether-polyorganosiloxane block copolymer according to claim 5, wherein the perfluoropolyether block (Rf) is represented by the following formula (6)

  (6)

wherein m is an integer of from 0 to 50, n is an integer of from 1 to 50 with m+n ranging from 2 to 60.

7. The perfluoropolyether-polyorganosiloxane block copolymer according to claim 2, wherein X is a methoxy group and the organosiloxane residue (W2) is represented by the following formula (10),

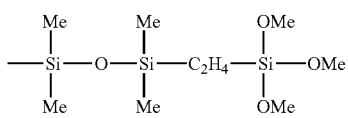 (10)

wherein Me represents a methyl group.

8. The perfluoropolyether-polyorganosiloxane block copolymer according to claim 1, wherein Q is a $C_{2-12}$ group having at least one selected from the group consisting of amide, ether and ester bonds.

9. A surface treatment composition comprising the perfluoropolyether-polyorganosiloxane block copolymer according to claim 1 and/or a partial condensate of hydrolyzates thereof.

* * * * *